United States Patent Office 2,721,115
Patented Oct. 18, 1955

2,721,115

PROCESS OF RECOVERING ZIRCONIUM OXIDE IN THE FORM OF CUBIC CRYSTALS

Robert A. Schoenlaub, Cleveland, Ohio, assignor, by mesne assignments, to Zirconium Corporation of America, Cleveland, Ohio, a corporation of Ohio No Drawing. Application September 19, 1951, Serial No. 247,359

3 Claims. (Cl. 23—16)

This relates to the production of zirconia. It relates also to the production of a particularly stable form of zirconia. The objects of the invention are as follows: To extract zirconia from its raw materials, with simple equipment, at low cost, without using electric power, and to produce a zirconia having as much uniformly dispersed CaO stabilizer as may be desired. Other objectives and advantages of the method will become apparent from the following description.

To the accomplishment of the foregoing and related ends, said invention then comprises the features hereinafter fully described and particularly pointed out in the claims, the following description setting forth in detail certain embodiments of the invention, these being indicative, however, of but a few of the various ways in which the principle of the invention may be employed.

The stabilization of zirconia is necessary for some purposes. Pure zirconia and natural forms (baddeleyite) crystallizes in the monoclinic system. On heating, it inverts sharply at 1800° F. to another crystal form with a linear contraction of about 1.8%. On cooling, it has a similar expansion. This abrupt change in dimensions destroys ceramic parts made from it. The inversion can be prevented by incorporating 4% or more of CaO or similar substances in solid solution in the zirconia. This produces a cubic or stabilized form which does not invert. More than 4% CaO can be used, sometimes to advantage. Less CaO will give the monoclinic form which is useful for chemical, metallurgical and polishing purposes.

A general method by which zirconia can be extracted from zircon and other zirconium materials is described in my co-pending application Serial No. 657,057, which has issued as Patent No. 2,578,748, December 18, 1951. It comprises the pyrochemical displacement of zirconia from zircon, etc. by basic oxides to form orthosilicates and zirconia and the separation of the zirconia from the silicates. The present method is a refinement of and an improvement over the procedure described in said co-pending application in that it gives higher recoveries, allows easier and cheaper processing and close control over the distribution and amount of stabilizer in the zirconia.

Said co-pending application describes the general class of silicate reaction products from which zirconia is separable as orthosilicates. Orthosilicates are salts of orthosilicic acid. More specifically, they are silicates in which the oxygen atoms associated with basic functioning oxides are to the oxygen atoms associated with acidic functioning atoms as 1:1. Forsterite ($2MgO \cdot SiO_2$) and nephelite ($Na_2O \cdot Al_2O_3 \cdot 2SiO_2$) are simple examples. This group, however, can be complex and reference may be had to Ford. (Dana's Textbook of Mineralogy, 4th ed., page 554, 1932.)

If the chemical system is more acid than provided by the orthosilicates, the zirconia is either combined or is inseparable. If the chemical system is more basic than provided by the orthosilicates, part or all of the zirconia is combined as zirconates, or ternary zirconium silicates, solid solutions, etc. and is inextractible as such.

I have now found that a few orthosilicates are particularly suitable for zirconia extraction. Alkali orthosilicates react with zirconium to form ternary zirconium silicates. The stronger bivalent basic oxides, SrO, BaO, CaO, etc. do not react cleanly with zircon and the reaction products are complex mixtures of orthosilicates, zirconates, zirconia and ternary zirconium silicates. Zirconia can be extracted from such mixtures but recoveries are low and the product is contaminated with zirconates and ternary zirconium silicates.

If a weak base such as magnesia is used, the reaction is clean but the separation of the products is difficult. If the oxide is very weakly basic, like alumina, separation is quite difficult. For these reasons orthosilicates composed of BaO, SrO and CaO alone or in combination or MgO and $Al_2O_3$ alone or in combination are not used when practicing the present invention.

I have found that the best orthosilicates for my purpose are those that contain a strong basic oxide and a weak basic oxide, used in approximately equal molecular amounts. Further, for best results a certain basicity balance should be maintained much like pH in aqueous chemistry. If one basic oxide is very strong like $Na_2O$, the other should be very weak like $Al_2O_3$. Nephelite ($Na_2O \cdot Al_2O_3 \cdot 2SiO_2$) is an example. If the one basic oxide is only moderately strong like CaO, the other should be moderately weak like MgO. Monticellite $$(CaO \cdot MgO \cdot SiO_2)$$

is an example. Other examples are akermanite $$(2CaO \cdot MgO \cdot SiO_2)$$

and gehlenite ($2CaO \cdot Al_2O_3 \cdot SiO_2$). Monticellite is preferred. The others can be used but processing is more difficult. It will be understood, of course, that when using certain types of raw materials, the orthosilicates formed may comprise mixtures of any two or more of those referred to above.

In the useful orthosilicate, such as monticellite, which is preferred, each kind of oxide has a specific function. The weaker basic oxide tends to render the zirconia free and insoluble in respect to solid solution and to make the reaction clean. The stronger basic oxides act dually as a stabilizer and render the silicate more readily separable, particularly in respect to acid digestion. Magnesia is uniquely suited for the first function although $Al_2O_3$, FeO, MnO and other weaker bases can be used. Calcium oxide is uniquely suited to the second functions although $Na_2O$, $K_2O$, BaO and SrO and MnO can also be used.

Zirconia made with orthosilicates of CaO and MgO will contain CaO. If the amounts of basic oxides used are somewhat less than that required to form monticellite, the zirconia will contain about 4% CaO. If the basic oxides are in excess of that required to form monticellite, the $ZrO_2$ will contain about 8% CaO. Thus, by controlling the proportions of zircon and basic oxides in the starting mixture, the amount of stabilizer in the $ZrO_2$ can be controlled between 4% and 8%.

It is often advantageous to produce an unusually pure zirconia or a zirconia crystallizing in the monoclinic system. This can be done by reacting the zircon with basic oxides to form monticellite and zirconia in the presence of a small amount of fluorspar. This reduces the CaO in the zirconia in proportion to the amount of fluorspar used. Usually it will be best to use an amount of fluorspar so as to replace up to 20% of the CaO, or up to 1 part of fluorspar for each 20 parts of zircon.

This also can be accomplished by adding one molecule of alumina $Al_2O_3$ to each two molecules of silica $SiO_2$ in the zircon plus one molecule of soda $Na_2O$ to form nephelite ($Na_2O \cdot Al_2O_3 \cdot 2SiO_2$).

The operation of the process is very simple. I merely mix one part of zircon with about one part of dolomite with or without up to 1/10 part of fluorspar and fire the mixture to from 2200 to 2750° F. Rotary kilns, brick kilns and similar furnaces which do not completely melt the batch may be used. The resulting clinker is cooled, crushed and ground to −200 mesh. It is formed into about a 5% slurry in water and enough mineral acid added to react with the basic oxides of the silicates plus a 10% excess. The slurry is agitated for about 2 hours. The residual zirconia is then separated from the dispersed silicate and colloidal sulfates, etc., and dissolved salts by classification, tabling, washing or any combination thereof. If desired, the residual zirconia can be washed in caustic solution to remove absorbed silica gel. These procedures of separation are described in more detail in my co-pending application Serial No. 657,057.

The products so produced have some unique characteristics. The cubic or stabilized grain occurs in uniform individual crystals about 20 microns in size. The CaO is uniformly dispersed in these crystals. This grain is directly suitable for many ceramic purposes or for abrasives where an uniformly sized tough and inert particle is required. Other known processes produce large crystal aggregates or impalpable powders, in which the CaO is not uniformly dispersed and which introduce serious grinding or shrinkage problems. Or the present process will produce elliptical crystals of monoclinic zirconia about 20 microns in size. These crystals have inverted from the tetragonal to monoclinic form and can be made to have any degree of crystal instability or friability that may be desired by varying the rate of cooling. They can have unique friability and reactivity or effective surface area for such purposes as polishing or chemical and metallurgical use.

The following are examples of my process:

I. 100 parts of zincon containing 66% $ZrO_2$ and 32% $SiO_2$ was mixed with 100 parts of dolomite containing 21.4% MgO and 30.3% CaO. This mixture was fired to 2600° F. for 4 hours, cooled, crushed and ground to −200 mesh. Approximately 150 parts of slag were obtained. This slag was made into a slurry with 3000 parts of water. This was agitated and 275 parts of 20° HCl added. Agitation was continued for 2 hours and the residual solids then removed and washed. These solids were slurried in 100 parts of water with 1 part of NaOH and agitated for ½ hour, washed, dewatered and dried. The yield was 64 parts of stabilized zirconia containing .1% $SiO_2$, 5.05% CaO, the remainder $ZrO_2$ and $HfO_2$.

II. To 100 parts of zircon and 100 parts of dolomite as described, was added 5 parts of fluorspar. The mixture was fired for 4 hours at 2400° F. The zirconia was separated as in Example I to obtain 63 parts of a monoclinic zirconia of the following composition: .1% $SiO_2$, 2.1% CaO, the remainder $ZrO_2$ and $HfO_2$.

III. To 100 parts of zircon was added 105 parts of dolomite and the mixture fired to 2600° F. for 4 hours. The zirconia was separated as in Example I yielding 65 parts of zirconia of the following composition: .005% $SiO_2$, 7.3% CaO, the remainder $ZrO_2$ and $HfO_2$.

Other modes of applying the principle of the invention may be employed, changes being made as regards the details described, provided the features stated in any of the following claims or the equivalent of such be employed.

I, therefore, particularly point out and distinctly claim as my invention:

1. A process of recovering zirconium oxide in the form of cubic crystals stabilized by the presence therein of from 4% to 8% CaO in solid solution which comprises: (a) mixing about 100 parts of zircon and about 100 parts dolomite, (b) forming an incompletely-fused clinker from such admixture by heating same to a temperature of from 2400° F. to 2600° F.; whereby said zirconium oxide crystals are formed and the CaO content thereof is formed from said dolomite, (c) cooling said clinker; (d) comminuting said clinker; and (e) separating from said comminuted mass crystals of said stabilized zirconium oxide.

2. A process of recovering zirconium oxide in the form of cubic crystals stabilized by the presence therein of from 4% to 8% CaO in solid solution which comprises: (a) mixing about 100 parts of zircon and about 100 parts dolomite, (b) forming a partially fused clinker from such admixture by heating same to a temperature not in excess of 2600° F.; (c) cooling said clinker; (d) comminuting said clinker; and (e) separating from said comminuted mass crystals of said stabilized zirconium oxide.

3. A process of recovering zirconium oxide in the form of cubic crystals stabilized by the presence therein of from 4% to 8% CaO in solid solution which comprises: (a) mixing about 100 parts of zircon, about 100 parts of dolomite and about 5 parts of fluorspar; (b) forming a partially fused clinker from such admixture by heating same to a temperature of about 2400° F.; (c) cooling said clinker; (d) comminuting said clinker; and (e) separating from said comminuted mass crystals of said stabilized zirconium oxide.

References Cited in the file of this patent

UNITED STATES PATENTS

| 2,076,080 | George | Apr. 6, 1937 |
| 2,084,630 | Deguide | June 22, 1937 |
| 2,256,536 | Udy | Sept. 23, 1941 |
| 2,578,748 | Schoenlaub | Dec. 18, 1951 |

FOREIGN PATENTS

| 462,866 | Great Britain | Mar. 17, 1937 |